United States Patent
Guilbeault et al.

(10) Patent No.: US 6,883,169 B1
(45) Date of Patent: Apr. 19, 2005

(54) APPARATUS FOR MANAGING THE INSTALLATION OF SOFTWARE ACROSS A NETWORK

(75) Inventors: Frederic Guilbeault, Ottawa (CA); Geoff I. Baskwill, Gatineau (CA)

(73) Assignee: Nortel Networks Limited, St-Laurent (CA)

( * ) Notice: Subject to any disclaimer, the term of this patent is extended or adjusted under 35 U.S.C. 154(b) by 699 days.

(21) Appl. No.: 09/803,016

(22) Filed: Mar. 12, 2001

(51) Int. Cl.$^7$ ............................................... G06F 9/445
(52) U.S. Cl. ..................... 717/178; 717/713; 709/203; 709/219
(58) Field of Search ................ 717/168–178; 709/201–213

(56) References Cited

U.S. PATENT DOCUMENTS 5,257,369 A * 10/1993 Skeen et al. ................ 719/312
5,555,416 A * 9/1996 Owens et al. ............... 717/178
5,717,930 A * 2/1998 Imai et al. ................... 717/176
6,115,713 A * 9/2000 Pascucci et al. ............. 707/10

* cited by examiner

Primary Examiner—Chameli C. Das
Assistant Examiner—Chuck Kendall

(57) ABSTRACT

A software installation manager for use in a data network. The software installation manager exchanges messages with individual nodes of a set of nodes for directing the installation of a software product on the nodes of the set in parallel according to a non-blocking sequence. The non-blocking sequence is characterized in that the installation of a software product on one node of the set does not block the installation of the software product on another node of the set.

26 Claims, 3 Drawing Sheets

APPARATUS FOR MANAGING THE INSTALLATION OF SOFTWARE ACROSS A NETWORK

FIELD OF THE INVENTION

The present invention relates to automated software installation, in particular to a method and to a device for installing software in a data network.

BACKGROUND OF THE INVENTION

Software deployment across a network is a time consuming task. When a network has a very large number of nodes, the installation of a software product on all the nodes or on a large subset of the nodes is done mostly manually, which is time consuming and prone to installation errors. This places network operators that manage large networks at a disadvantage when a software upgrade must be performed across the network. For example, it is estimated that performing a software upgrade on a network that contains in excess of 10,000 nodes may require no less than 10 months.

Accordingly, there is a need in the industry to provide solutions for automating, at least in part, the installation of software in a network such that the installation can be completed faster than what is done currently with existing methods.

SUMMARY OF THE INVENTION

In a broad aspect the invention provides a software installation manager for use in a data network. The data network includes a set of nodes having a topology characterized in that a message directed from a first node of the set to a third node of the set passes through a second node of the set.

The software installation manager includes a control entity that exchanges messages with individual nodes of the set for causing installation of at least one software product on the nodes of the set in parallel according to a non-blocking sequence. The non-blocking sequence is characterized in that the installation of a software product on one node of the set does not block the installation of the software product on another node of the set.

The principal advantage of this apparatus over prior art software installation techniques resides in the ability to conduct the installation of the software product in parallel across several nodes of a data network where messages directed to one node transit through another node. The ability to perform the software installation in a non-blocking fashion across the nodes significantly reduces the time required to deploy the software product, in particular when the deployment has to be made over a large number of nodes.

For the purposes of this specification, the expression "installation in parallel" does not imply that all the steps or stages of the installation of the software occur at the same time for all the nodes. Rather, this expression should be interpreted broadly to mean that a certain step of the installation process at one node happens at the same time the same step, or a different step of the installation process, is being conducted at another node.

For the purposes of this specification, the expression "software product" should be interpreted broadly to include application software, operating system software, hardware drivers, software loaded on a hardware platform, software upgrades, and so on.

In a specific non-limitative example of implementation of the invention, the software installation manager is controlled by a network manager entity. When an operator initiates at the network manager entity a software upgrade process, say through a Graphical User Interface (GUI), the network manager issues control to messages to the software installation manager. In response to the control messages, the control entity of the software installation manager issues messages to the nodes of the set where the software product is to be installed. The messages convey commands that direct the software installation on each node. The order of some of the commands is selected according to a non-blocking sequence, to avoid one node blocking the installation of the software product on another node. The non-blocking sequence can be fixed, having been previously established on the basis of the network topology in which the installation is performed. Alternatively, the nonblocking sequence is dynamically established to suit changing environments. At this end, the control entity has a node sequencing entity that determines the non blocking sequence based on the number of communication hops between each node of the set of nodes and a point of reference in the data network.

One of the commands sent to the nodes of the set according to the non-blocking sequence is a command to cause the nodes to reboot. Usually, this is done to activate the software product being installed. The use of the non-blocking sequence prevents a situation where a message commanding a certain node to reboot fails to reach its destination because the message is blocked by another node in the process of rebooting (a node in the process of rebooting loses message passing capability). Advantageously, the messages are sent such that at least some of the nodes of the set perform coincident rebooting and preferably all of the nodes of the set perform coincident rebooting. By "coincident", it is meant that when one node has reached some arbitrary phase of the rebooting process, at that same point in time another node is also undergoing rebooting. To be "coincident" the rebooting of the nodes needs not begin at the same time, end at the same time or reach certain phases at the same time.

The control entity keeps track of the progress of the software product installation on each node and documents relevant events in a log. The log is conveyed to the network manager such that the information can be displayed to the network operator.

The invention also provides a method for performing software product installation in a data network.

BRIEF DESCRIPTION OF THE DRAWINGS

A detailed description of examples of implementation of the present invention is provided hereinbelow with reference to the following drawings, in which.

Figure 1:
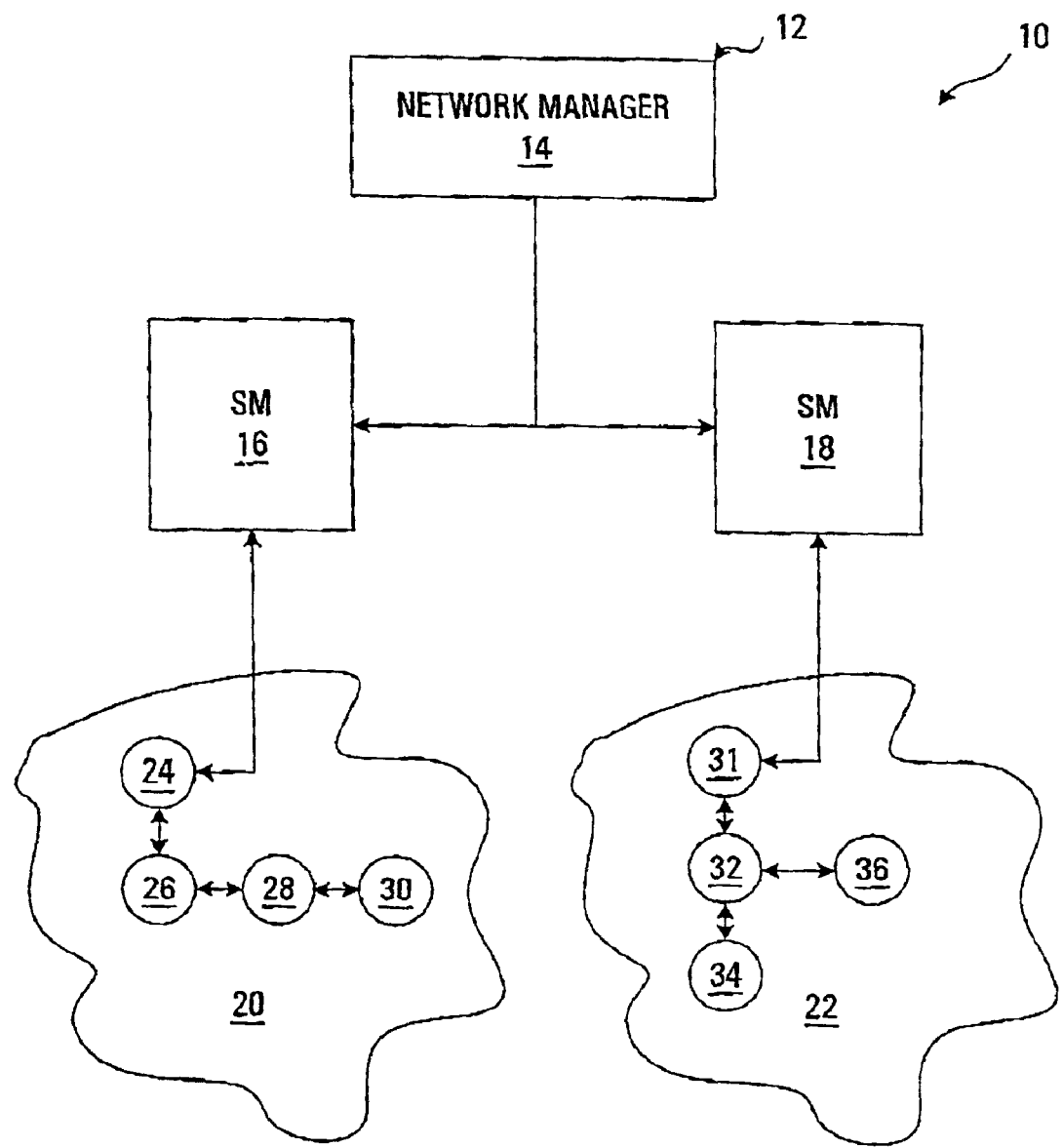
FIG. 1 is a functional block diagram of a data network including software installation managers according to an embodiment of the present invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 illustrates a data network 10. The data network 10 transports digitized information such as data, voice or video among others. The data network includes a plurality of nodes connected to one another by communication links also called "hops". A single node is usually in the form of a workstation or server, while a communication link can be implemented by a physical signal conductor, such as a metal cable or optical fiber, or the air interface allowing a wireless transmission.

In one example of implementation, the data network 10 may be a telecommunications network where the communication links are optical links that use the SONET communication protocol The nodes may be designed to provide a message passing/routing functionality and signal amplification in addition to other more specific tasks. The data network 10 includes a node 12 that implements a network manager 14 The network manager 14 is an entity at which a human operator can control the data network 10 through a user interface whose function is to receive operator commands and deliver information to the operator. Advantageously, the user interface is a Graphical User Interface (GUI). The user can enter commands through any suitable input device, such as a keyboard, pointing device, touch screen, voice commands or any other suitable device. Information delivered by the user interface is of visual nature presented on a screen. In addition, the visual information can be supplemented with audible information.

The network manager 14 makes available to the operator data descriptive of the network 10. In general, this data contains information about the structure of the network. In one specific example of implementation, the data descriptive of the network 10 contains information about the various nodes and subnetworks that form the data network 10. The information about the nodes and subnetworks may include the list of the nodes and subnetworks, namely their identifiers such as labels and/or IP addresses and the number of nodes in each subnetwork, among other type of information. The data descriptive of the data network 10 may also include information about the current software releases running on each node and subnetwork, the hardware components connected to each node and subnetwork, or any other suitable information.

The information about the structure of the data network 10 is displayed to the operator through the user interface. The manner with which the data descriptive of the network can be displayed by the userinterface can vary widely. In a specific example, the user interface shows a list of subnetworks and their associated labels. Optionally, the user can select any one of the entries in that list to expand the information associated with the entry and show additional details of the particular subnetwork, such as individual nodes of the subnetwork.

The data network 10 also comprises a plurality of Subnetwork Management (SM) nodes 16, 18. One function of the SM nodes 16, 18 is to direct the installation of a software product on a respective set of nodes. FIG. 1 shows that the SM node 16 is associated with a set of nodes 20 while the SM node 18 is associated with a different set of nodes 22. The set of nodes 20 has four nodes namely nodes 24–30. The set of nodes 22 also has four nodes 31–36.

The topology of the sets of nodes 20 and 22 is such that messages directed to one node of a set transit through another node of the set. Examples of this topology includes a linear network, a ring network, a tree network and a network that is a combination of two or more of the previous categories, among others. The set of nodes 20 is constructed according to a linear network topology, while the set of nodes 22 is constructed according to a tree network.

Figure 2:
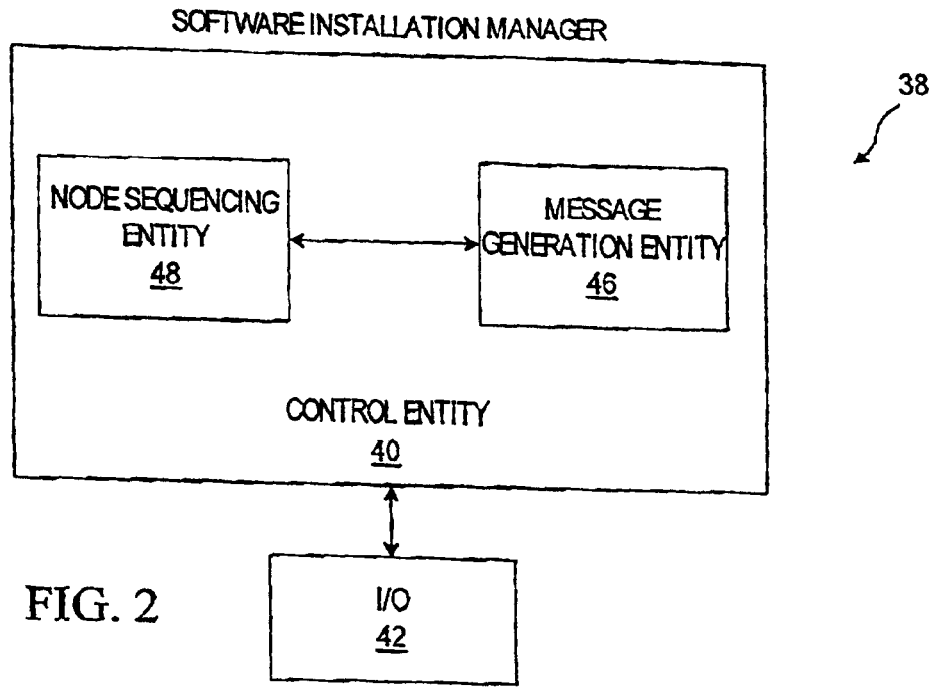
FIG. 2 is a more detailed block diagram of the software installation manager shown in FIG. 1.

FIG. 2 provides a detailed functional block diagram of an SM node 16. The functional block diagram of the SM node 18 is identical. The SM node 16 performs the function a software installation manager 38 that is implemented as a program element executed by the computing device forming the SM node 16. The program element exists physically on a computer readable storage medium. The memory in the computing device of the SM node 16 is an example of a computer readable storage medium. The computer readable storage medium may take different forms without departing from the spirit of the invention.

The software installation manager 38 includes two main components, namely a control entity 40 and an Input/Output port (I/O) 42 that constitutes a point through which the control entity 40 can exchange messages with the external world, such as the network manager 14, the nodes 24–30 or any other node of the data network 10. The control entity 40 includes two sub-components, namely a message generation entity 46 and a node sequencing entity 48 The main function of the message generation entity 46 is to produce the messages that are directed to the nodes 24–30 to direct the installation of the software product on them. The main function of the node sequencing entity 48 is to determine a non-blocking sequence according to which at least some steps of the software product installation will be made on the nodes 24–30, such that the installation of the software product on one node 24–30 blocks the installation of the software product on another node 24–30.

The embodiment of the software installation manager 38 shown in FIG. 2 is under the direct control of the network manager 14. In this example the network manager 14 is the master and the software installation manager 38 is the slave. The operator at the GUI of the network manager 14 commands the beginning of the software installation process. At this end, the network manager 14 will produce control messages that are sent to each SM node 16, 18. When an SM node 16, 18 receives the control message, it initiates the local software installation process limited to the nodes under its control.

Figure 3:
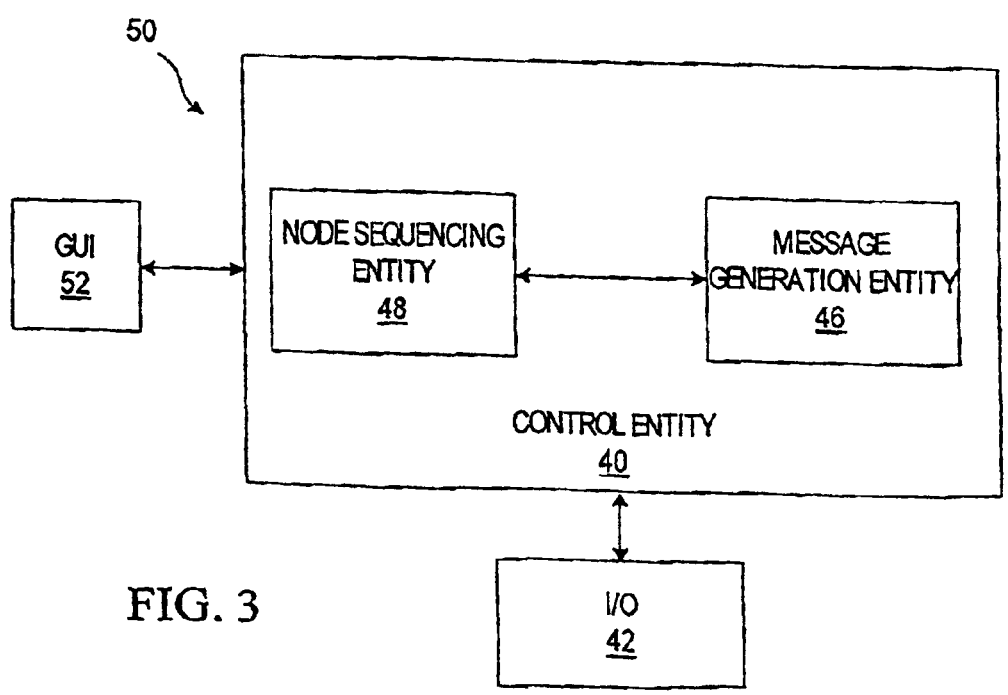
FIG. 3 is block diagram of the software installation manager in accordance with a variant.

FIG. 3 illustrates a variant of the software installation manager, identified by the reference numeral 50. The difference with the previous embodiment resides in the presence of a GUI interface 52 that allows an operator to locally control the software installation manager 50 rather than through the intermediary of the network manager 14. Evidently, both functionalities can be implemented together, such that the software installation manager can respond to the network manager 14 and also possess a GUI interface 52 for local control when such necessity arises.

Figure 4:
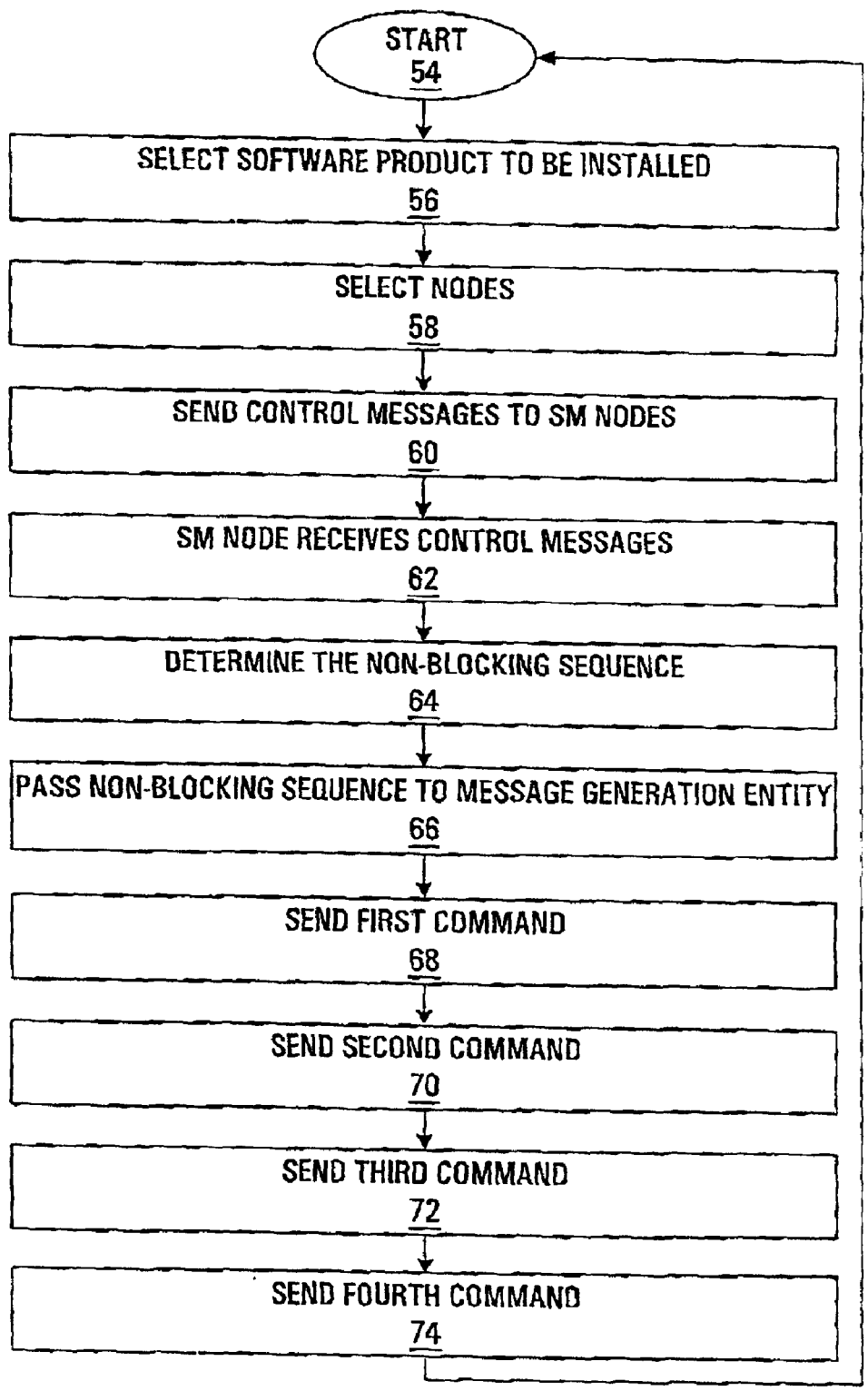
FIG. 4 is a flowchart illustrating the sequence of events taking place when the software installation manager shown in FIG. 1 installs software at one or more nodes of the data network.

A detailed example of operation of the software manager 38 will now be described in connection with the flowchart of FIG. 4. At step 54, the operation starts. At step, 56 the operator enters commands on the user interface of the network manager 14 to select the particular software product that is to be installed. At step 58, the operator enters commands on the user interface to specify on which nodes of the data network 10 the software products are to be installed. Assume for the sake of this example that nodes 24–30 and 31–36 are selected. At step 60, the network manager constructs control messages and forwards the control messages to SM nodes 16, 18. Each SM node 16, 18 receives a dedicated set of such control message(s), where each control message(s) specifies the software product to be installed, the source of the load files of the software product, the nodes on which the installation is to made, among other possible information.

At step 62, each SM node 16, 18 receives the control message(s) through I/O 42. Each SM node 16, 18 handles the control message(s) in the same way. For simplicity only the steps in connection with SM node 16 will be described and reference to the SM 18 will be made only to illustrate features unique to that node.

The installation of the software product performed under the direction of the SM node 16 can be generally divided in five main stages. Those stages are:

1. Order nodes into non-blocking sequence;
2. Download catalogue file from server to nodes;
3. Download load files from server;
4. Activate nodes to software product;
5. Commit nodes to software product.

It should be expressly noted that the above sequence of stages can be altered without departing from the invention. Such alterations include the omission of one or more steps, the addition of one or more steps or a change in the sequence of the steps.

At step 64, the node sequencing entity determines the non-blocking sequence according to which the installation of the software product is to be made. The non-blocking sequence can be established in several ways. A first possibility is to use a fixed, non-blocking sequence that has been predetermined according to the current node set topology. A second possibility is to dynamically determine the non-blocking sequence. This can be done by ordering the nodes 24–30 on the basis of the number of communication hops between the node and a certain point of reference. In this example, the point of reference is the SM node 16. The number of communication hops to the nodes 30, 28, 26 and 24 is respectively 4, 3, 2 and 1. In the case of the SM 18, the point of reference is the SM node 18 and number of communication hops to the nodes 36, 34, 32 and 31 is respectively 3, 3, 2 and 1.

Several possibilities exist to establish the number of communication hops from a point of reference to a certain node. One such possibility is for the SM node 16 to obtain from the network manager 14 information on the topology of the data network 10, from which the information on the number of communication hops to a point of reference can be extracted. Another possibility for the SM node 16 is to send to each node 24–30 a query message to prompt the node 24–30 to generate a response message indicative of the number of communication hops between the node and the point of reference.

Several possibilities exist as to the selection of the point of reference. One possibility, mentioned earlier, is to consider the SM 16 as the point of reference. This is done because the configuration of the set of nodes 20 is such that messages exchanged between any one of the nodes 24–30 and the external world (a node external to the set of nodes 20) must transit through the SM 16. A more complex situation arises when the set of nodes 20 is not restricted to communicate with the external world through a single node. Assume for the sake of this discussion that the set of nodes 20 can communicate with the external world though two points of entry/exit, one being the SM node 16 and one being another node (not shown). If during the software installation process, messages directed to the nodes 24–30 will transit through either one of the points of entry/exit then the establishment of the non-blocking sequence may require taking in consideration a second point of reference.

In general, the present invention is not restricted to a particular non-blocking sequence or a particular algorithm or method for determining the non-blocking sequence given a certain network topology. The person skilled in the art will appreciate that a large number of possibilities exist, other than those presented in this specification, to establish a non-blocking sequence such that the software installation on one node does not block the software installation on another node.

Once the node sequencing entity 48 has established the non-blocking sequence, this data is passed at step 66 to the message generation entity 46.

In general, steps 66 and 64 correspond to stage 1 of the software product installation.

At step 68, that corresponds to stage 2 above, the message generation entity 46 will send messages to the nodes 24–30 to convey a first command. The first command directs the nodes 24–30 to fetch a catalogue of files from a file server in the data network 10. Assume for the sake of this example that the file server is implemented by the SM node 16. Here the messages are sent without following the non-blocking sequence since during the catalogue fetching operation each node 24–30 retains its message passing capability, thus one node does not block messages directed to downstream nodes. The messages conveying the first command are sent in rapid sequence to the nodes 24–30 such that the nodes are instructed at about the same time to initiate the catalogue fetching operation. The catalogue fetching operation occurs concurrently on the nodes 24–30. Also, the control entity 40 starts to log relevant events. One of these events is the dispatch of the first command, and whether or not each node has acknowledged receipt and/or completion of the directives to fetch the catalogue of files.

The control entity 40 will not wait indefinitely for a node 24–30 to respond. After a timeout period, the non-responding node 24–30 is considered as "failed" and an entry to this effect is entered in the log.

At step 70, corresponding to stage 3 above, the message generation entity 46 issues messages to nodes 24–30 (except the nodes previously marked "failed") to convey a second command which directs the individual nodes 24–30 to fetch the files in the catalogue of files obtained earlier. Those files are the load files from which the software installation will proceed. As with the first command, the messages conveying the second command are sent without following the non-blocking sequence since during the files fetching operation each node 24–30 retains its message passing capability. Each node 24–30 (except any node previously identified as "failed") is expected to acknowledge the reception of the second command and/or completion of the files fetching operation. After a timeout period, nodes that have not responded are marked "failed" in the log.

As with the first command, the messages conveying the second command are sent in rapid sequence to the nodes 24–30 such that the nodes are instructed at about the same time to initiate the file fetching operation. The file fetching operation occurs generally concurrently on the nodes 24–30.

At step 72 that corresponds to stage 4 above the message generation entity 46 issues messages to nodes 24–30 to convey a third command which directs the individual nodes 24–30 to activate the new software product. In practice, this is effected by rebooting the nodes 24–30. Since during rebooting the nodes lose their message passing capability the non-blocking sequence is followed. The message generation entity 46 will first issue a message with the third command to the node 30 only and follow with a message with the third command to the node 28 only when the node 30 has acknowledged reception of the third command. This sequence continues with the message containing the third command being sent to the node 26 and finally to the node 24. Again, any relevant events are noted in the log. In practice, all the messages containing the third command are sent over a short time period, say a few seconds, while the rebooting takes several minutes. By following the non-blocking sequence, coincident rebooting of the nodes 24–30 can be accomplished, thus allowing saving a significant amount of time.

For the SM 18, the sequence of the third command dispatch is as follows. The message containing the third command is sent to the nodes 34 and 36 at the same time. The sequence continues with the message containing the third command being sent to the node 32 after the nodes 34 and 36 have acknowledged reception of the third command. Finally the third command is sent to the node 31, after the node 32 has acknowledged reception of the third command.

At step 74 that corresponds to the stage 5 above, the message generation entity 46 issues messages to nodes 24–30 to convey a fourth command which directs the individual nodes 24–30 to commit to the new software. During the committal, the files relating to any previous version of the new software product software are erased such that the node cannot be returned to the previous version of the software product. Here the non-blocking sequence is not used since during the committal the nodes maintain their message passing capability. Evidently, the non-blocking sequence may be used if desired or if during the committal the message passing capability of the nodes is lost.

The software installation process is now completed and the control entity sends the log through an appropriate message to the network manager 14 such that the information in the log can be displayed to the network operator, identifying the nodes on which the installation of the software product was successful and the nodes where a failure occurred, with information about the reason of the failure.

The messages described earlier can be based on a variety of protocols. Connection oriented protocols can be used, such as Transmission Control Protocol Internet Protocol (TCPIP), common Management Information Protocol (CMIP) and Simple Network Management Protocol (SNMP). Also connectionless protocols can be used such as User Datagram Protocol Internet Protocol (UDPIP). Other protocols can also be used without departing from the spirit of the invention.

Although various embodiments have been illustrated, this was for the purpose of describing, but not limiting, the invention. Various modifications will become apparent to those skilled in the art and are within the scope of this invention, which is defined more particularly by the attached claims.

What is claimed is:

1. A computer readable storage medium containing a program element for execution by a computing device to implement a software installation manager in a data network including a set of nodes, the set of nodes having a topology characterized in that a message directed from a first node of the set to a third node of the set passes through a second node of the set, said software installation manager including:

a) a control entity;

b) an I/O for the exchange of messages between said control entity and the plurality of nodes;

c) said control entity operative to perform a software product installation process, said software product installation process including generation of messages directed to the nodes of the set for causing installation of at least one software product on the nodes of the set in parallel according to a non-blocking sequence of nodes; and d) the non-blocking sequence being characterized in that installation of the at least one software product on one node of the set does not block installation of the software product on another node of the set.

2. A computer readable storage medium as defined in claim 1, wherein said control entity includes a node sequencing entity for dynamically determining the non-blocking sequence.

3. A computer readable storage medium as defined in claim 2, wherein said node sequencing entity is responsive at least in part to data indicative of a number of communication hops between a point of reference and each node of the set to derive the non-blocking sequence.

4. A computer readable storage medium as defined in claim 3, wherein said node sequencing entity is operative to issue a query message to each node of the set to prompt the node to generate a response message indicative of the number of communication hops between the point of reference and the node.

5. A computer readable storage medium as defined in claim 4, wherein the data indicative of the number of communication hops between the point of reference and each node of the set is derived from response messages received by node sequencing entity from each node of the set.

6. A computer readable storage medium as defined in claim 5, wherein the point of reference is a location of a file server in the data network holding at least one software load downloaded by the nodes of the set to perform the installation of the at least one software product.

7. A computer readable storage medium as defined in claim 2, wherein said control entity includes a message generation entity in communication with said node sequencing entity, said message generation entity being responsive to data produced by said node sequencing entity and being indicative of the non-blocking sequence to issue at least some messages to nodes of the set according to an order determined by the non-blocking sequence.

8. A computer readable storage medium as defined in claim 2, wherein the messages convey commands for execution by the nodes of the set.

9. A computer readable storage medium as defined in claim 8, wherein the messages convey a first command for instructing each node in the set to fetch a catalogue of files from a file server in the data network.

10. A computer readable storage medium as defined in claim 9, wherein the messages convey a second command for instructing each node in the set to fetch files from the catalogue of files from the file server in the data network.

11. A computer readable storage medium as defined in claim 10, wherein the messages convey a third command for instructing each node to activate the at least one software product.

12. A computer readable storage medium as defined in claim 11, wherein the messages convey a fourth command for instructing each node to commit to the at least one software product.

13. A computer readable storage medium as defined in claim 11, wherein said control entity is operative to issue messages conveying the third command according to the non-blocking sequence determined by the node sequencing entity.

14. A computer readable storage medium as defined in claim 13, wherein the third command causes each node of the set of nodes to reboot.

15. A computer readable storage medium as defined in claim 14, wherein said control entity awaits a confirmation of a node in the set of nodes acknowledging reception of the third command before sending the third command to a next node in the set of nodes according to the non-blocking sequence.

16. A computer readable storage medium as defined in claim 13, wherein said control entity is operative to track progress of the installation of the at least one software product on each node of the set.

17. A computer readable storage medium as defined in claim 16, wherein said control entity is operative to generate a log indicative of the nodes of the set on which the installation of the at least one software product has failed.

18. A computer readable storage medium as defined in claim 17, wherein the log indicates for each node of the set on which the installation has failed, the reason for the failure.

19. A computer readable storage medium as defined in claim 1, wherein said control entity is responsive to messages issued by a network manager entity to initiate said software product installation process.

20. A computer readable storage medium as defined in claim 19, wherein said control entity is operative to generate a log indicative of the nodes of the set on which the installation of the at least one software product has failed and to generate messages directed to the network manager conveying the log to the network manager.

21. A computer readable storage medium containing a program element for execution by a computing device to implement a software installation manager in a data network including a set of nodes, the set of nodes having a topology characterized in that a message directed from a first node of the set to a third node of the set passes through a second node of the set, said software installation manager including:
   a) control means;
   b) an I/O means for the exchange of messages between said control means and the plurality of nodes;
   c) said control means operative to perform a software product installation process, said software product installation process including generation of message means directed to the nodes of the set for causing installation of at least one software product on the nodes of the set in parallel according to a non-blocking sequence of nodes; and
   d) the non-blocking sequence being characterized in that installation of the at least one software product on one node of the set does not block installation of the software product on another node of the set.

22. A subnetwork management node in a data network, the data network including a set of nodes other than the subnetwork management node, the set of nodes having a topology characterized in that a message directed from a first node of the set to a third node of the set passes through a second node of the set, said subnetwork management node comprising:
   a) a control entity;
   b) an I/O for the exchange of messages between said control entity and the set of nodes;
   c) said control entity operative to perform a software product installation process, said software product installation process including generation of messages directed to the nodes of the set for causing installation of at least one software product on the nodes of the set in parallel according to a non-blocking sequence of nodes; and
   d) the non-blocking sequence being characterized in that installation of the at least one software product on one node of the set does not block installation of the software product on another node of the set.

23. A method to perform software installation in a data network, said method comprising:
   a) sending messages to each node in a set of nodes, the set of nodes having a topology characterized in that a message directed from a first node of the set to a third node of the set passes through a second node of the set;
   b) the messages directing installation of at least one software product on each node of the set;
   c) the messages being sent to the nodes of the set in a manner to cause the installation of the at least one software product in parallel according to a non-blocking sequence of nodes; and
   d) the non-blocking sequence being characterized in that installation of the at least one software product on one node of the set does not block installation of the software product on another node of the set.

24. A computer readable storage medium containing a program element for execution by a computing device to implement a software installation manager in a data network including a set of nodes, the set of nodes having a topology characterized in that a message directed from a first node of the set to a third node of the set passes through a second node of the set, said software installation manager including:
   a) a control entity;
   b) an I/O for the exchange of messages between said control entity and the plurality of nodes;
   c) said control entity operative to perform a software product installation process, said software product installation process including generation of messages directed to the nodes of the set for causing installation of at least one software product on the nodes in several stages;
   d) one of said stages including rebooting of the nodes of the set; and
   e) said software product installation process including generation of messages directed at the nodes of the set according to a non-blocking sequence commanding at least a plurality of the nodes of the set to perform coincident rebooting.

25. A computer readable storage medium as defined in claim 24, wherein said software product installation process including generation of messages directed at the nodes of the set according to a non-blocking sequence commanding all nodes of the set to perform coincident rebooting.

26. A computer readable storage medium as defined in claim 25, wherein said control entity includes a node sequencing entity for dynamically determining the non-blocking sequence.

* * * * *